United States Patent Office 2,789,489
Patented Apr. 23, 1957

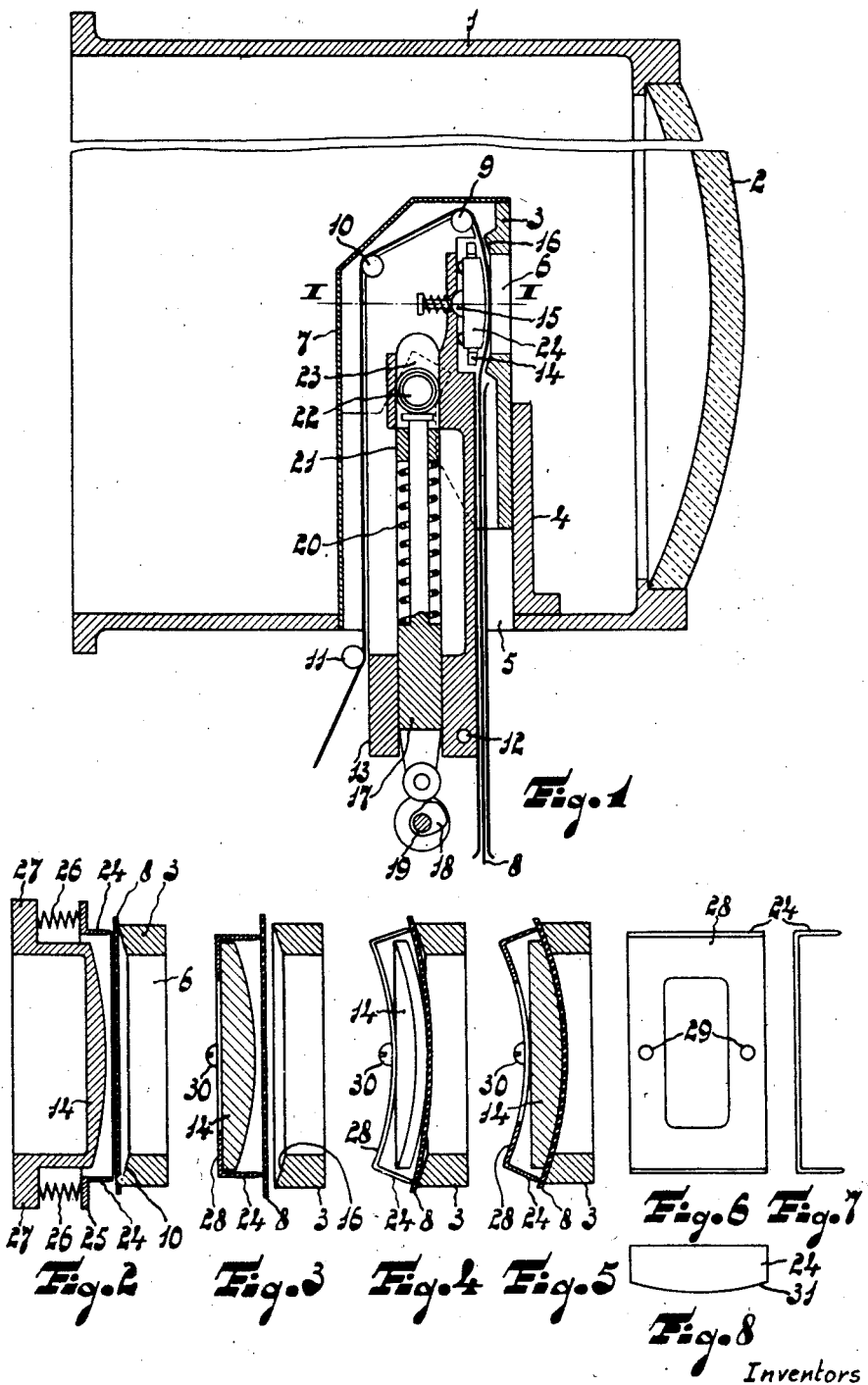

2,789,489

X-RAY FILM HOLDING DEVICE

Wiechert Zwakenberg and Gijsbertus Veldhuysen, Eindhoven, Netherlands, assignors, by mesne assignments, to North American Philips Company, Inc., New York, N. Y., a corporation of Delaware Application February 24, 1953, Serial No. 338,528

Claims priority, application Netherlands February 28, 1952

4 Claims. (Cl. 95—31)

This invention relates to improvements in devices for holding films.

The present invention relates to a film holding device for use in indirect X-ray photography comprising an optical system with a mirror and a flat luminescent screen for collecting the X-rays. The screen converts the X-ray to a light image which is reflected from a mirror on the film so that a film recording may be made. The projection surface for the luminescent image is convexspherically curved if expensive correction lenses are to be avoided. The element of a film strip, on which the image is produced, is required to have exactly the same shape and therefore it is kept taut over a support.

The film is pressed into a curved shape between the convex surface of the support and a ledge constituting a frame which is hollow at its side facing the film and curved accordingly. The support will hereinafter be termed the pressure table, the ledge being termed the push frame. The push frame does not prevent the rays producing the image from reaching the film which, viewed from the mirror, is behind the aperture in the push frame, the so-called image gate.

During the pressing operation the film is stretched at the middle and compressed to a greater or lesser degree at its edges which entails difficulties. A film portion stretched at the middle tends to wrinkle at the edges thus causing folds or cracks when the film is clamped between the pressure table and the push frame. It has been found that the thickness of the film is of importance and a thickness of 0.15 mm. with a film size of 45 x 45 mms. satisfies reasonable conditions. When using a film of different size also a different thickness is required. It is undesirable to be limited to a particular type of film which might be unsuitable for other reasons. In view of the quality of the image it should be possible to choose the optimum film in each instance.

The present invention relates to a device of the aforesaid type and has for its purpose to mitigate the aforesaid limitation so that any film may be used which is adapted to be stretched on the curved surface of the pressure table. In accordance with the invention, means are provided by which the film strip is pressed at its edges against the push frame prior to deforming the film between the pressure table and the push frame. Hence, the film cannot wrinkle at its clamped edges, since it is clamped when being flat, and in addition, wrinkling in a transverse direction is avoided during the pressing operation. It is sufficient for the film to be clamped at its edges. This may be effected by means of flat metal strips, the narrow side of which engages the pressure surface of the push frame and the shape of which corresponds to the said surface. In order that the film shall not be cut through between said edges and the pressure surface which might happen if the strips are pressed too tightly, it is advisable that the pressure should be exerted by springs.

The strips may be connected to the pressure table by means of springs. They extend above the surface of the pressure table so that during deformation of the film, first the clamping strips and subsequently the surface of the pressure table engage the film strip.

Due to the great difference between the tension at the middle of the image element and at its edges in a transverse direction of the film, adaptation of the film to the surface of the pressure table may sometimes be insufficient whereby the quality of the image is adversely affected. This is mitigated by clamping strips constituting flanged edges of a flat plate of resilient material which are secured to the back of the pressure table in a manner such that, after clamping the film between the strips and the push frame, the edges of the clamping strips move away from each other if the pressure table and the push frame approach each other.

In order that the invention may be readily carried into effect, it will now be described with reference to the accompanying drawing representing, by way of example, one embodiment of the invention and in which—

Fig. 1 shows a part of a film holding device incorporating the invention.

Fig. 2 is a sectional view thereof taken on lines I—I of Fig. 1 showing an example of the manner of carrying the invention into effect.

Fig. 3 is another example of the manner of carrying the invention into effect.

Figs. 4 and 5 illustrate two phases in carrying out the invention by means of the construction shown in Fig. 3.

Figs. 6, 7 and 8 are three detail views of the resilient member shown in Fig. 3.

Referring now more particularly to the drawings and especially Fig. 1, the mirror camera embodying the present invention comprises a housing 1, made for example, from an aluminum alloy or other suitable metal, in which a mirror 2 is fitted. This mirror may consist of a spherical glass plate whose convex surface is covered with a reflecting metal layer. The open end of the housing 1 faces a luminescent screen (not shown) which serves as an object of which an image is to be obtained. The light radiated by the X-ray image produced on the luminescent screen is projected through the mirror 2 into the gate of a pressure frame 3 which is rigidly secured to the wall of the housing 1 by means of a support 4.

The wall of the housing 1 is provided with an aperture 5 giving access to a space which, except for an image gate 6, is closed by a wall 7 in such a manner as to preclude light. The film 8 is introduced in the form of a loop through the aperture 5 and conveyed in front of the film gate 6 over guide rollers 9, 10 and 11 secured to an arm 13 pivoting about shaft 12. A pressure table 14 is fitted, by means of a ball and socket joint 15 to the arm 13 behind the film path at the film gate 6. When the arm 13 pivots, the table 14 is pressed against the push frame 3, thus the ball and socket joint 15 provide pressure that is evenly distributed over the surface area 16 of said frame. The pressure table 14 has a spherically curved surface, the area of pressure 16 being conformingly concave.

The arm 13 pivots by means of a rod 17 which is lifted by a cam 18 upon rotation of shaft 19. The upward movement of rod 17 is transmitted by means of spring 20 to a part 21 which is movable in a guide path. The roller 22 forms part of 21 and moves in an oblique path 23 provided in the side walls of push frame 3 so that upon displacement of the roller the arm 13 turns about the pin 12 and moves the table 14 in the direction of the push frame 3. Upon termination of this movement the film strip 8 is clamped and pressed into a spherical form. In this position the sensitized surface of the film in the image gate 6 corresponds to the shape of the projection surface on which the object is sharply reproduced by the mirror so that the exposure can be made. On further rotation of shaft 19 the pressure table resumes its initial position, the film then being released so that it may be displaced over a distance corresponding to one image element.

One of the clamping strips used in accordance with the invention for stretching the film is denoted by the numeral 24, the construction of which is shown in Figs. 2 and 3.

Fig. 2 is a sectional view of the pressure table 14, the film 8 and the push frame 3 on the line I—I in Fig. 1, the film 8 extending freely between the table 14 and the push frame 3. In this position it is adapted to be moved over a distance corresponding to one image element in order to move a non-exposed part of it in front of the image gate 6 after each exposure. At both sides of the pressure table 14 is provided metal strip 24, the narrow edge of which faces the film. The strips may be secured to a rectangular frame 25 furnished with an aperture for the passage of the table 14. The frame is connected by means of springs 26 to the edge 27 of the pressure table. Upon displacement of the pressure table 14 in the direction of the push frame 3 the strip 24 engages the film 8 and urges it against the pressure area 16 of frame 3 prior to pressing the film into the aforesaid form by further displacement of the table 14. On approaching frame 3 the pressure of springs 26 increases so that the film is clamped more tightly if the tension of the film increases during the pressing operation.

Fig. 3 shows a corresponding construction where the metal strips 24 constitute flanged edges of a plate 28 of resilient material, for example spring steel. The shape of plate 28 is seen from Figs. 6, 7 and 8 showing it from three sides. Fig. 8 shows that the edge 31 of each clamping strip 24 corresponds to the form of the pressure surface 16 of push frame 3. Plate 28 is secured by means of two screws 30 passing through apertures 29 to the back of the pressure table 14. Displacement of the pressure table in the direction of the push frame 3 results in that the film 8 is clamped against the pressure area 16 and subsequently pressed into a spherical shape, the pressure of clamping the film increasing similarly to the construction shown in Fig. 2.

As will be seen from Figs. 4 and 5, the clamping strips 24 move in a direction away from each other if pressure table 14 approaches closer to the push frame 3 thereby effecting the stretching of the film. This is of particular importance in the case of using very elastic film strips or film strips that have thicknesses which are very different from the optimum thickness for the customary film size used. The invention permits of using thinner or thicker films in choosing the film material, and in this regard it is only necessary to consider the properties required for obtaining images of excellent quality.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. A film holding device comprising a movable supporting table having a convex surface, a frame being provided with a ledge portion extending substantially at the periphery of the convex surface, an element having a part thereof projecting beyond said convex surface of said supporting table, said element being operatively connected to said supporting table for movement to initially clamp a film strip at its edges between said element and said ledge portion, and means for moving said table toward said ledge portion to thereby cause the intermediate portion of the film strip to conform to said convex surface of the supporting table whereby said film strip is maintained taut over the convex surface of said supporting table.

2. A film holding device comprising a movable supporting table having a convex surface, a frame being provided with a ledge portion extending substantially at the periphery of the convex surface, an element having a pair of parts projecting beyond said convex surface of said supporting table and yieldably urged toward said ledge portion, said parts being positioned perpendicular to said film strip, said parts being operatively connected to said supporting table for movement to initially clamp a film strip at its edges between said parts and said ledge portion, and means for moving said table toward said ledge portion to thereby cause the intermediate portion of the film strip to conform to said convex surface of the supporting table whereby said film strip is maintained taut over the convex surface of said supporting table.

3. A film holding device as set forth in claim 2 wherein said parts are metal strips.

4. A film holding device as set forth in claim 2 wherein said element is secured to said supporting table at the side of the table remote from said film strip, and said parts being moved in a direction away from each other as said supporting table moves in a direction toward said ledge portion.

References Cited in the file of this patent

UNITED STATES PATENTS

| 1,744,773 | Labrely | Jan. 28, 1930 |
| 1,870,091 | Breichle | Aug. 2, 1932 |
| 1,881,352 | Couade | Oct. 4, 1932 |
| 1,944,228 | Fairall | Jan. 23, 1934 |
| 1,980,600 | Spoor | Nov. 13, 1934 |
| 2,528,308 | Helm | Oct. 31, 1950 |

FOREIGN PATENTS

| 36,567 | France | Mar. 18, 1930 |
| | (Addition to No. 622,718) | |